(12) United States Patent
Lubyanskyy et al.

(10) Patent No.: US 10,958,514 B2
(45) Date of Patent: Mar. 23, 2021

(54) GENERATING APPLICATION-SERVER PROVISIONING CONFIGURATIONS

(71) Applicant: RED HAT, INC., Raleigh, NC (US)

(72) Inventors: Oleksiy Lubyanskyy, Neuchatel (CH); Emmanuel Hugonnet, Barraux (FR); Brian Edward Stansberry, Ballwin, MO (US)

(73) Assignee: Red Hat, Inc., Raleigh, NC (US)

( * ) Notice: Subject to any disclaimer, the term of this patent is extended or adjusted under 35 U.S.C. 154(b) by 75 days.

(21) Appl. No.: 16/512,552

(22) Filed: Jul. 16, 2019

(65) Prior Publication Data
US 2021/0021464 A1    Jan. 21, 2021

(51) Int. Cl.
*H04L 29/08*    (2006.01)
*H04L 12/24*    (2006.01)

(52) U.S. Cl.
CPC ...... *H04L 41/0806* (2013.01); *H04L 41/0843* (2013.01); *H04L 41/5048* (2013.01)

(58) Field of Classification Search
CPC ............. H04L 41/0806; H04L 41/5048; H04L 41/0843
See application file for complete search history.

(56) References Cited

U.S. PATENT DOCUMENTS

| 8,347,263 | B1 * | 1/2013 | Offer ........................ G06F 8/71 717/104 |
| 9,146,721 | B1 * | 9/2015 | Nagaraja ............... G06F 9/5077 |
| 9,164,749 | B2 | 10/2015 | Dehaan |
| 9,819,547 | B2 | 11/2017 | Maini et al. |
| 10,157,084 | B2 | 12/2018 | Nachtrab et al. |
| 10,225,323 | B2 | 3/2019 | Revanuru et al. |
| 10,298,770 | B1 * | 5/2019 | Liu ..................... H04M 7/0087 |
| 2015/0142934 | A1 * | 5/2015 | Craine .................. H04L 67/125 709/221 |
| 2015/0254067 | A1 * | 9/2015 | Nigam ............... H04L 41/0843 717/175 |
| 2015/0378703 | A1 * | 12/2015 | Govindaraju ......... G06F 9/5072 717/174 |
| 2017/0078144 | A1 * | 3/2017 | Purusothaman .... G06F 9/44505 |
| 2018/0336027 | A1 * | 11/2018 | Narayanan ................ G06F 8/60 |

OTHER PUBLICATIONS

Denise, J., "WildFly 16 and Galleon, Towards a Cloud Native EE Application Server," Mar. 1, 2019, https://wildfly.org/news/2019/03/01/Galleon_Openshift/.
Loubyansky, A., et al., "Galleon Decumentation," 2018, http://docs.wildfly.org/galleon/#_general_provisioning_workflow.
Nunez, C., "Why Configuration Management and Provisioning are Different," Feb. 7, 2017, http://www.thoughtworks.com/insights/blog/why-configuration-management-and-provisioning-are-different.

* cited by examiner

*Primary Examiner* — Oanh Duong
(74) *Attorney, Agent, or Firm* — Kilpatrick Townsend & Stockton LLP

(57) ABSTRACT

Systems, methods, and non-transitory computer-readable media are disclosed for generating provisioning templates for application servers. An example method includes loading a first application server in a runtime environment, identifying features and associated files used by the first application server at runtime, generating a provisioning template including a description of the subset of the identified features and how the files support each of the subset of features, and using the provisioning template to configure a second application server.

20 Claims, 4 Drawing Sheets

GENERATING APPLICATION-SERVER PROVISIONING CONFIGURATIONS

TECHNICAL FIELD

The present disclosure relates generally to application-server configuration. More specifically, but not by way of limitation, this disclosure relates to generating provisioning templates for configuring application servers.

BACKGROUND

An application server provides components accessible to a software developer through a standard application programming interface (API) configured for a specific platform. Application servers typically include a wide variety of services, such as web applications, clustering, fail-over, and load-balancing services. The features of these services are specified in configuration files.

DETAILED DESCRIPTION OF THE INVENTION

Figure 1:
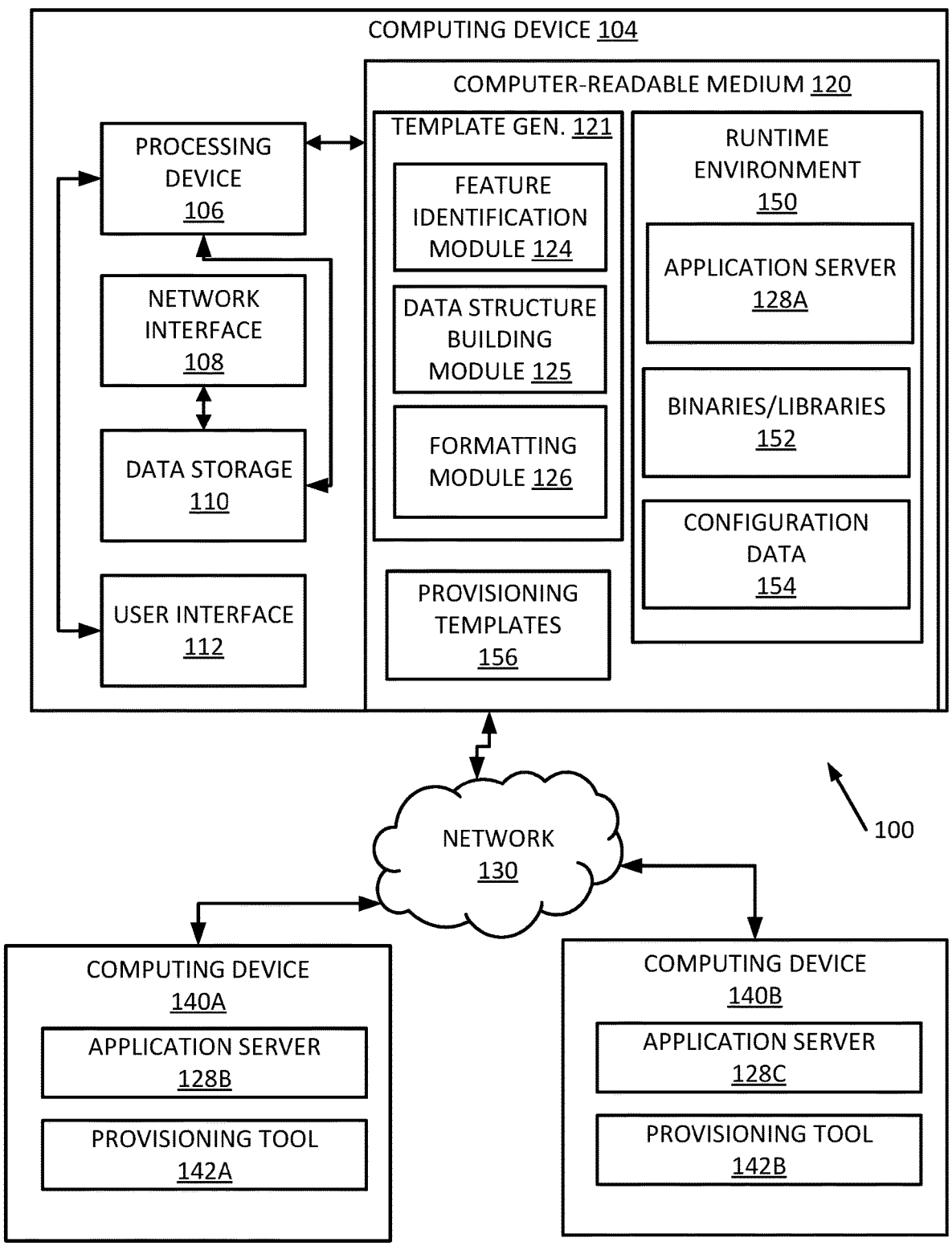
FIG. 1 is a block diagram of an example of a system for generating application-server provisioning configurations according to some aspects.

Currently, architects and developers manually write the configuration files specifying the provisioning features they are adding or modifying for each part of an application server. However, current solutions are not scalable because every developer needs to have a deep working knowledge of the formatting and syntaxes acceptable to the particular provisioning tool (e.g., Galleon) that will be ingesting the configuration files, so that their configuration files are compatible with the provisioning tool. For example, the importation of features from one application server to another is performed manually, which requires a good knowledge of the application server to build the management model in order to write the configuration files correctly. This is time consuming, costly, difficult, and prone to error.

Certain aspects and features of the present disclosure overcome one or more of the abovementioned problems by dynamically generating provisioning templates that can be quickly ported to other application servers. For example, a fully configured, test application server can have all of the target features, e.g., services and tools offered by the application server, loaded at runtime. The target features can be features requested by a user or any subset of all available features and configurations of the test application-server. The target features loaded at runtime may not be configured for any particular target installation (e.g., on a second application server). The server can then perform introspection by analyzing its current state to determine its available features and configurations, and describe those features in a provisioning template. The provisioning template can reflect the current operating capabilities of the test application-server. Provisioning template generation can be performed on the fly when users request access to features or can be done recursively, or at intervals. A provisioning tool can use the generated provisioning template to port some or all of the features and configurations of the test application server to similar application servers (e.g., via a software update containing the feature and configurations). This technique circumvents the need to manually map and port features from one application server to other application servers, thereby increasing flexibility, reducing costs, and minimizing errors such as installation or compatibility errors.

An exemplary provisioning template can include feature descriptions related to multiple features and configurations of the test application server. Each feature description for each unique feature may specify a unique name or feature ID for a feature specification in the provisioning template; how the feature is built; dependencies on the ascendant resources; required binary packages; required or optional configuration parameters and their types; capabilities provided by the feature; required capabilities of the feature; and dependency relationships with other features. The feature descriptions for each feature can be combined in the generic feature template, which can be used to port features to other application servers.

Some examples may involve further processing of the feature descriptions that form the basis of the provisioning template. For instance, the features can be matched to other features across the usage patterns of all features in the application server to produce a unique map of features for a standalone server or a server in a cluster. That is, associating each feature of the application server with its various tasks and activities and other features that share those tasks and activities, produces a comprehensive generic description of how each feature is used without requiring specific implementation details. This information can be used by another application server to implement the feature in a manner that performs the same tasks and activities. Redundant features and those that are already defined for an implementation on another application server can be removed.

Certain aspects of the present disclosure thus enable the generation of provisioning templates for copying features from one application server to another without requiring knowledge of some or all the implementation details of the other application server. Using the methods of the various aspects, developers can make feature changes to one application server implementation and automatically provide a resulting provisioning template to a provisioning tool to import those changes to other application servers. The provisioning tool can read the provisioning template and provide a list of available features of a user, allowing the user to select some or all of the features of the test application server for import to another application server. This may reduce the need for deep knowledge of the system during each stage of importation. Thus, the various aspects may save time and monetary resources by quickly and efficiently copying and installing features to other application server implementations. The various aspects can also reduce the number of errors made during feature export/import due to lack of knowledge by a transferring developer.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for generating generic provisioning templates according to some aspects. The system 100 includes template generation engine 121 having a number of software modules 124-126 enabling the features and characteristics of an application server 128A to be determined by identifying or extracting configuration information related to the application server 128A at runtime.

The application server 128A may be executed in a runtime environment 150 and stored on one or more networked computing devices, such as computing devices 104, 140A, and 140B. The template generation engine 121 and its various software modules 124-126 may be implemented in software and stored on a non-transitory computer readable medium 120.

A software module may be a self-contained, installable module with computer-executable program code for enabling the template generation engine 121 to interact with other device components and modules. The software modules 124-126 may be produced by various sources, such as different companies or organizations. For example, an organization operating computing device 140B may generate a formatting module 126 for producing a generically formatted template and/or a library of templates, which may be used by the template generation engine 121 to generate provisioning templates for a target application server. By enabling various sources to create their software modules 124-126, improved diversity in programming languages for which provisioning templates may be generated can be achieved.

In some examples, the software modules 124-126 can be open source and programmed using the same programming language. This may enable a community of developers to quickly and easily create, update, and debug the software modules 124-126, thereby improving the number and quality of the software modules 122-126 available. The software modules 124-126 may be stored in a centralized repository (e.g., GitHub™), from which they can be downloaded (e.g., via the Internet) and installed for use by template generation engine 121.

The system 100 of FIG. 1 includes a computing device 104 in communication with one more other computing devices 140A-B through a network 130 via a network interface 108. The network 130 may include any type of network. For example, network 130 may include a local area network, (LAN), a wide area network (WAN), the Internet, or a wireless network, etc. In some examples, the computing device 104 may include specialized testing circuitry/logic and a non-transitory computer readable medium 120. The non-transitory computer readable medium 120 may include software applications and software code, such as the template generation engine 121, software modules 124-126, and application server 128A. In some examples, the computing device 104 may be a dedicated device or computer having a combination of computer hardware and software (fixed in capability or programmable) specifically designed for executing a specialized function. Specialized discrete non-generic analog, digital, and logic based circuitry may include specially designed components (e.g., a specialized integrated circuit, such as for example an Application Specific Integrated Circuit (ASIC) designed for only implementing an automated process for improving software technology associated with interaction generation modules and associated hardware devices resulting in improved operation of the associated hardware devices.

In some examples, computing devices 140A-B may be running versions of an application server 128B-C in runtime environments similar to or the same as runtime environment 150. The versions of application servers 128B-C can differ from the version of application server 128A, which may be a test application server. For example, the application server 128B-C on each of the computing devices 140A-B may comprise a different version or build configuration. Computing devices 140A-B may be physical or virtual, local or remote, single instance or multi-instance, cumulous or distributed, etc. The features and characteristics of the application server 128A available when it is loaded in runtime environment 150 can be identified, analyzed, and exported to the computing devices 140A-B. The computing devices 140A-B can use a provisioning tool 142A-B to load the provisioning template and inform a user about the features made available through the provisioning template. A user can select one or more features to port to application server 128B-C and then use the provisioning tool to install the features, enabling their own version of the application server to leverage the features in a respective application server 128B-C.

Computing device 104 may receive provisioning feature requests from one or more of the other computing devices 140A-B, an online repository, a website, or elsewhere via a network interface 108. Such requests may include an indication of a specific provisioning feature or a set of provisioning features that the requester would like to implement on a target application server (e.g., application server 128B-C). The computing device 104 can receive such requests, generate a generic provisioning template including the requested provisioning features using the template generation engine 121 and its software modules 124-126 and return the produced provisioning template to the requesting computing device such as 140A-B for installation using a provisioning tools 142A-B.

As mentioned above, the template generation engine 121 can include a feature identification module 124. The feature identification module 124 can be configured for analyzing or parsing configuration data 154 and files 152 of the application server 128A in the runtime environment 150, to identify various features or characteristics of application server 128A at runtime. In some examples, the runtime environment 150 is a Java runtime environment and the configuration data 154 may be stored in memory as part of a tree structure (e.g., implemented to track task threads). The feature identification module 124 can traverse the tree structure to identify all available features and characteristics available at runtime, without building an additional data structure associating the features and their supporting files (e.g., binaries/libraries). An additional data structure containing the feature information may be built and stored for later use if so desired by a user.

Additionally or alternatively, the feature identification module 124 can work collaboratively with data structure building module 125 to identify features and build a data structure linking identified features to the files that support those features in a runtime environment 150. For example, a parser can analyze input in the form of a sequence of tokens (e.g., words) or program instructions to build a data structure, such as a parse tree or an abstract syntax tree. The data structure building module 125 may use natural language processing, programming language processing, or both to identify the functions, syntaxes, commands, arguments, and operators for the features available in the application server 128A during runtime. These features can be identified by the feature identification module 124 and extracted by the data structure building module 125 of template generation engine 121.

The formatting module 126 can use the characteristics of the application server 128A to fill in fields of a template with feature and supporting file information. The processing device 106 may extract the features and characteristics from the one or more data structures according to instructions of the formatting module 126 and may use the extracted features to populate entries within a provisioning template under construction. In this manner, provisioning templates 156 can be generated by using the features from the built-in tree structure of Java (or Python, or various other programming languages) in conjunction with a generic template.

In some examples, a provisioning template includes, for each feature, segments of program code that are configurable based on the features of the application server 128A. The program code may be derived from (and/or may be portions of) the supporting files associated with each feature. Instead of the including the supporting files themselves, the provisioning template can identify the supporting files by name, along with any relevant portions required to implement the feature. A generic template may provide fields to be filled in with features of application server 128A to produce a specific provisioning template. Commonly used provisioning templates 156 can be pre-determined and stored on the computing device, such as in data storage 110.

Generated provisioning templates 156 can be exported to computing devices 140A-B. A provisioning tool 142A-B can receive the provisioning templates and use the provisioning templates to build installation packages for the computing devices 140A-B. The provisioning templates supplied to each of the computing devices 140A-B may depend on the version of a respective application interface, e.g., application server, and the features desired by a user of the computing devices 140A-B. For example, a user may select features that they wish to port to another application server using a user interface 112. The selected features may be presented in a provisioning features request message. Selected provisioning features can represent all or a subset of available features.

The components shown in FIG. 1 are exemplary, and other examples can include more components, fewer components, different components, or a different configuration of the components shown in FIG. 1.

Figure 2:
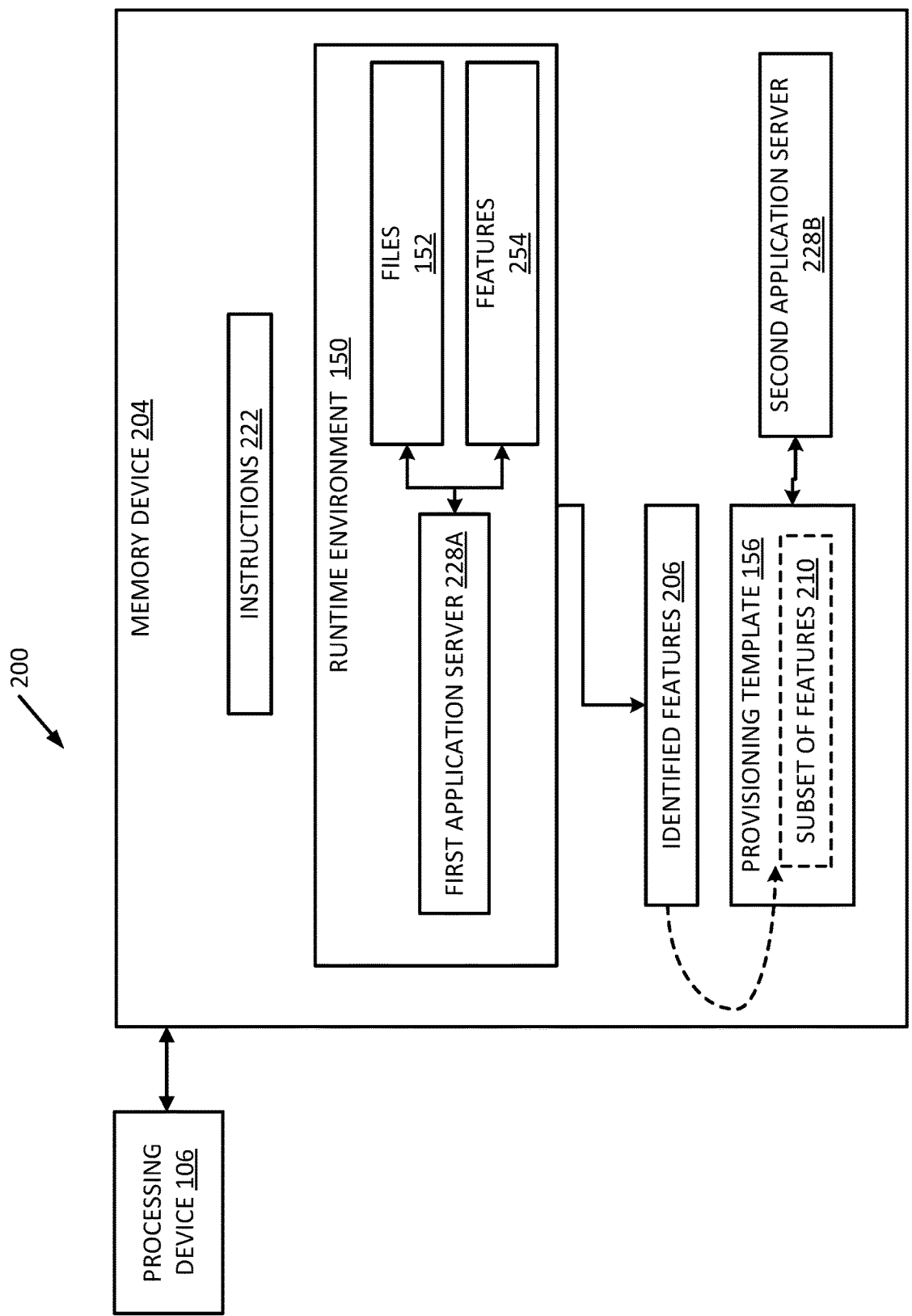
FIG. 2 is a block diagram of another example of a system for generating application-server provisioning configurations according to some aspects.

FIG. 2 is a block diagram of another example of a system 200 for generating provisioning templates according to some aspects. The components shown in FIG. 2 are exemplary, and other examples can include more components, fewer components, different components, or a different configuration of the components shown in FIG. 2.

The system 200 includes a processing device 106 communicatively coupled with a memory device 204. In some examples, the processing device 106 and the memory device 204 can be part of a computing device, such as computing devices 104 and 140A-140D. The processing device 106 can include one processing device or multiple processing devices. Non-limiting examples of the processing device 106 include a Field-Programmable Gate Array (FPGA), an application-specific integrated circuit (ASIC), a microprocessor, etc. The processing device 106 can execute instructions 222 stored in the memory device 204 to perform operations. In some examples, the instructions 222 can include processor-specific instructions generated by a compiler or an interpreter from code written in any suitable computer-programming language, such as C, C++, C#, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 106 can read instructions 222. A computer-readable medium can include electronic, optical, magnetic, or other storage devices capable of providing the processing device 106 with computer-readable instructions 222 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 222.

In some examples, the processing device 106 can determine features 254 and files 152 of a first application server 228A (e.g., application server 128A). The features 254 can be the features available when the first application server 228A is loaded in a runtime environment 150. This can yield a set of identified features 206. The processing device 106 can build a provisioning template 156 based on some or all of the identified features 206. For example, the processing device 106 can build a provisioning template 156 having just a subset 210 of the identified features 206. The provisioning templates 156 can then be interpreted by a provisioning tool (e.g., provisioning tools 142A-B) and used to enable a second application server 228B (e.g., application servers 128B-C) to include the some or all of features identified in the provisioning template 156.

Figure 3:
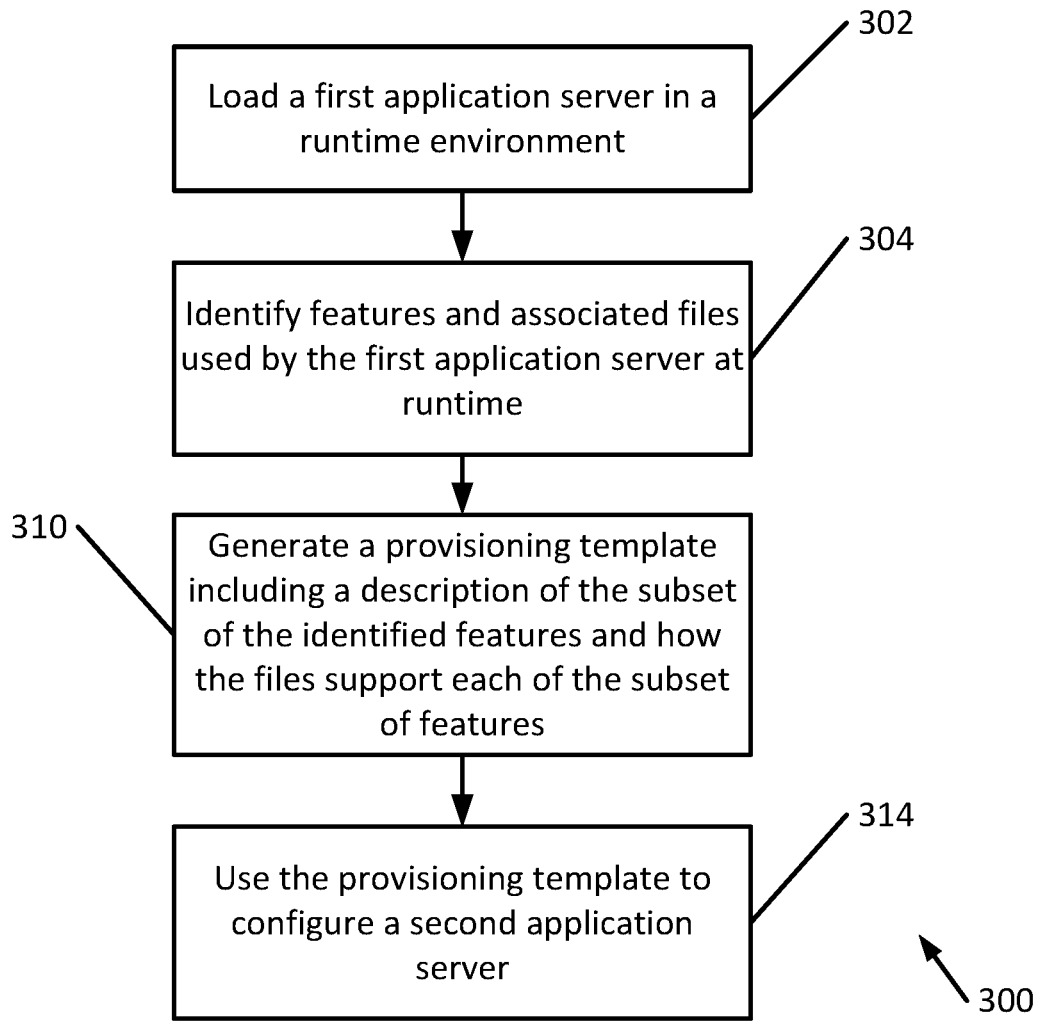
FIG. 3 is a flow diagram of an example of a process for generating application-server provisioning configurations according to some aspects.

FIG. 3 is a flow chart of an example of a process 300 for generating provisioning information such as a provisioning template according to some aspects. Other examples can include more steps, fewer steps, different steps, or a different order of the steps than is shown in FIG. 3. The steps of FIG. 3 are discussed below with reference to the components discussed above in relation to FIGS. 1-2.

In block 302 of process 300, the processing device 106 loads a first application server in a runtime environment. More specifically, the processing device 106 can load the first application server 228A (e.g., application server 128A) in the runtime environment 150 with all available features configured. This may be a "test" configuration of the first application server 228A, in which all possible configurations are made available or known. The version and specific implementation of the first application server 228A may be irrelevant to the generation of a provisioning template 156, because all available features and configurations will be generically described in the produced provisioning template.

In block 304 of process 300, the processing device 106 identifies features 254 and files 152 used by the first application server 228A at runtime. The processing device 106 may implement this step in some examples by applying feature identification module 124 to a data structure or model of the runtime environment 150. More specifically, the feature identification module 124 can identify configuration options available during runtime of the first application server 228A. For example, in a Java runtime environment, the feature identification module 124 may use a search function or spider to traverse the Java task tree structure, identifying all available features, characteristics, and service parameters. These provisioning features relate to or describe service configuration options for services and tools offered by the application server. These features may provide additional functionality to the application server, describe particular service configurations, configurable service parameters, and the like. Providing the configuration files in this generic format can enable a software installation tool can more easily ingest, analyze, and validate configuration files from different installation packages to reduce or eliminate the interoperability and configuration issue.

The processing device 106 can further use the feature identification module 124 to determine one or more supporting files 152 that support each configuration option. In implementations involving a Java runtime environment, the supporting files can be associated with each feature 254 (e.g., configuration option) they support using the task tree structure of Java. In other implementations, the feature identification module 124 can analyze library calls and perform binary interpretation to determine which portions of supporting files support each identified feature.

Thus, at the end of block 304, raw provisioning data including identified features 254 and corresponding portions of supporting files 152 is available for formatting. The raw provisioning data can be determined by the first application server 228A performing introspection of its state. Examples of the raw provisioning data can include: a unique name for the feature specification; how a feature is built; dependencies on the ascendant resource; required binary packages; required or optional configuration parameters and their types; capabilities provided by this feature and required capabilities, and dependency relationships with other features. In the next step, the process 300 writes the feature descriptions in a final format.

In block 310 of process 300, the processing device 106 generates a provisioning template 156 including at least a subset of the features 210 identified using feature identification module 124. For example, the formatting module 126 can match identified features 206 to their associated supporting files 152, and then add these to a generic template. Generic templates can provide a number of fields to be filled with a feature and description of its association with various supporting files. The formatting module 126 can also remove the features that are already defined in imported feature packs or that are redundant.

In block 314 of process 300, the processing device 106 uses the provisioning template 156 to configure a second application server 228B (e.g., application servers 128B-C of FIG. 1). More specifically, the provisioning template 156 is provided to a provisioning tool stored on the computing device 104 or another computing device 140A-B. The provisioning tool can interpret (e.g., parse or analyze) the provisioning template and configure the second application server 228B to include the features in the provisioning template 156. For example, the processing device 106 can use the provisioning tool to remotely configure another application server 128B-C, or may transmit the provisioning template 156 to another computing device 140A-B, which can use its own provisioning tool 142A-B to include the features.

Figure 4:
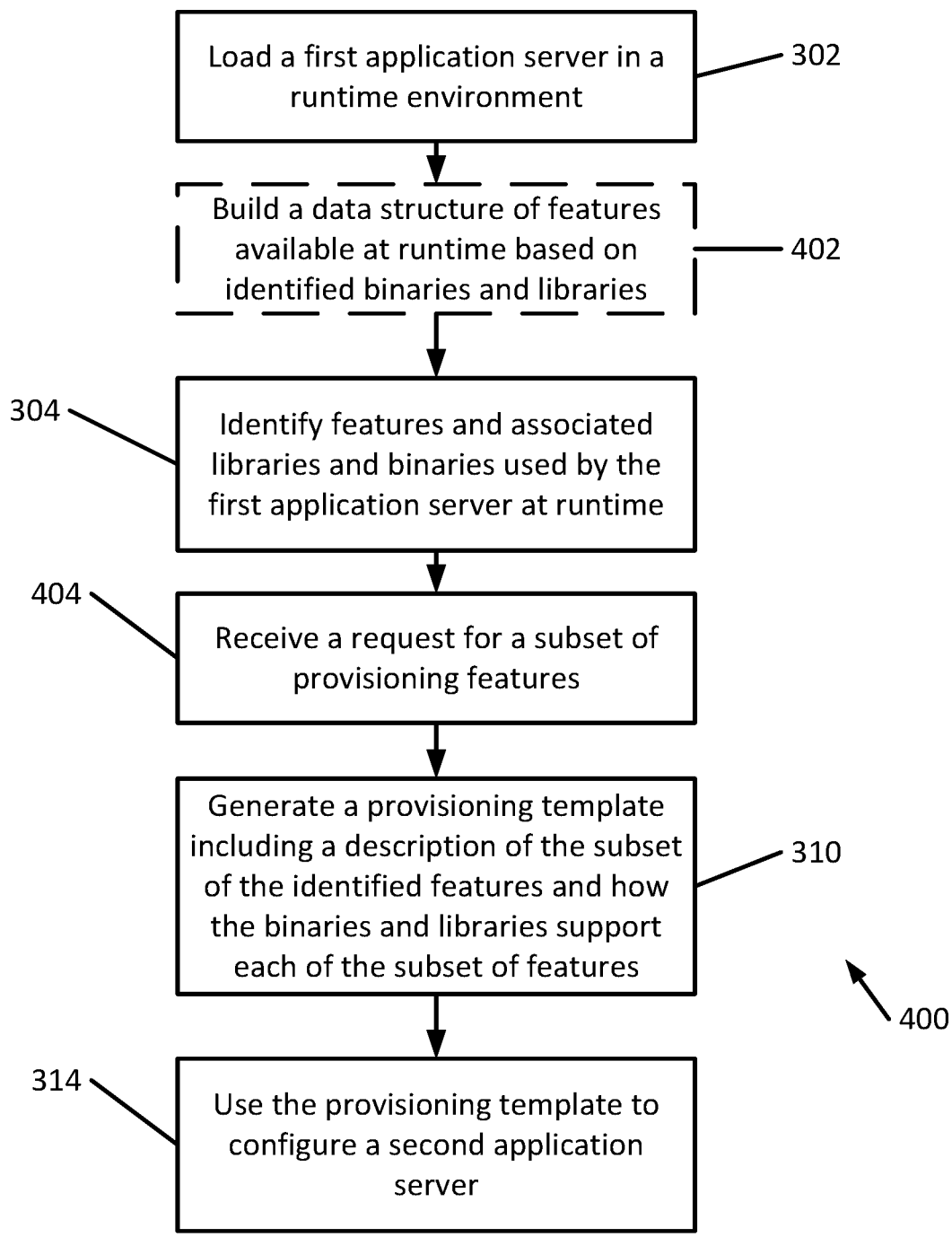
FIG. 4 is a flow diagram of another example of a process for generating application-server provisioning configurations according to some aspects.

FIG. 4 is a flow chart of another example of a process 400 for generating provisioning information such as a provisioning template according to some aspects. Other examples can include more steps, fewer steps, different steps, or a different order of the steps than is shown in FIG. 4. The steps of FIG. 4 are discussed below with reference to the components discussed above in relation to FIG. 1.

The operations of process 400 can correspond closely to those described in FIG. 3 with reference to process 300. For example, blocks 302, 304, 310, and 314 of process 400 can be the same as corresponding blocks in process 300 of FIG. 3. Additional operations of certain aspects are described with reference to process 400.

In block 402 of process 400, the processing device 106 builds a data structure including the identified features and their associated supporting files using data structure building module 125. The data structure can be stored in the data storagee for use in building future provisioning templates. More specifically, the processing device 106 can use data structure building module 125 to generate a tree, multi-dimensional linked list, or other data structure in which identified features are stored in association with some or all of the binaries and libraries that support those features at runtime. The data structure building module 125 may analyze source code, library calls, binary interpretation, and other system communications to identify the binaries and libraries needed to support the function of each identified feature. Once this information is added to the data structure, it can be quickly accessed in response to future provisioning feature requests, without requiring the reload and analysis of the test application, as disclosed with reference to blocks 302 and 304.

In block 404 of process 400, the processing device 106 receives a request for at least a subset of provisioning features. The processing device 106 can receive provisioning-feature request messages from any of computing devices 140A-B. The provisioning-feature request message can indicated one or more subsets of features that the requester desires to include in a provisioning template. The provisioning-features request message may be initiated by a user or automatically initiated by an application interface of a software application requiring updates or expanded features.

In response to receiving the request message, the processing device 106 can use the components of the template generation engine 121 to identify the requested subset of features and associated binaries and libraries. In certain aspects, this includes traversing a task tree to identify the requested features and their associated supporting binaries and libraries. In other aspects, this includes searching a data structure, such as that built in block 402, to identify the requested features. The processing device 106 can then generate the provisioning template including the requested subset of the features and use the provisioning template to configure the one or more other application servers (e.g., second application server 228), as in blocks 310 and 314.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
   a processing device; and
   a memory device including instructions that are executable by the processing device for causing the processing device to:
   load a first application server in a runtime environment;
   identify provisioning features and associated files used by the first application server at runtime;
   generate a provisioning template including a description of the identified provisioning features and how the files support each of the identified provisioning features; and
   use the provisioning template to configure a second application server.

2. The system of claim 1, wherein the files include binaries and libraries associated with the first application server.

3. The system of claim 1, wherein the instructions are further executable to cause the processing device to:
receive a request for a subset of the provisioning features,
identify the subset of provisioning features and the files supporting the subset of provisioning features;
generate the provisioning template including the subset of provisioning features and the files supporting the subset of provisioning features; and
use the provisioning template to configure the second application server.

4. The system of claim 3, wherein the second application server transmitted the request for the subset of provisioning features.

5. The system of claim 1, wherein identifying the features and associated files used by the first application server at runtime includes:
identifying service configuration options for the first application server available during runtime of the first application server; and
determining one or more files that support each of the service configuration options.

6. The system of claim 1, wherein the instructions are further executable to cause the processing device to:
build a data structure including the identified provisioning features and their associated files; and
store the data structure for use in building future provisioning templates.

7. The system of claim 1, wherein the instructions are further executable to cause the processing device to traverse a runtime environment tree-structure to identify the provisioning features and associated files.

8. A computer-implemented method comprising:
loading a first application server in a runtime environment;
identifying provisioning features and associated files used by the first application server at runtime;
generating a provisioning template including a description of the identified provisioning features and how the files support each of the identified features; and
using the provisioning template to configure a second application server.

9. The method of claim 8, wherein the files include binaries and libraries associated with the first application server.

10. The method of claim 9, further comprising:
receiving a request for a subset of provisioning features;
identifying the subset of provisioning features and the files supporting the subset of provisioning features;
generating the provisioning template including the subset of provisioning features and the files supporting the subset of provisioning features; and
using the provisioning template to configure the second application server.

11. The method of claim 10, wherein the second application server transmitted the request for the subset of provisioning features.

12. The method of claim 8, wherein identifying the provisioning features and associated files used by the first application server at runtime includes:
identifying service configuration options available during runtime of the first application server; and
determining one or more of the files that support each of the service configuration options.

13. The method of claim 8, further comprising:
building a data structure including the identified provisioning features and the associated files; and
storing the data structure for use in building future provisioning templates.

14. The method of claim 8, wherein the runtime environment is a Java runtime environment, and wherein identifying the provisioning features and associated files used by the first application server at runtime includes traversing a runtime environment tree structure to identify provisioning features and the associated files.

15. A non-transitory computer readable medium including instructions executable by a processing device for causing the processing device to:
load a first application server in a runtime environment;
identify provisioning features and associated files used by the first application server at runtime;
generate a provisioning template including a description of the identified provisioning features and how the files support each of the identified features; and
use the provisioning template to configure a second application server.

16. The non-transitory computer readable medium of claim 15, wherein the files include binaries and libraries associated with the first application server.

17. The non-transitory computer readable medium of claim 16, further comprising instructions that are executable by the processing device for causing the processing device to:
receive a request for a subset of provisioning features,
identify the subset of provisioning features and the files supporting the subset of provisioning features;
generate the provisioning template including the subset of provisioning features and the files supporting the subset of provisioning features; and
use the provisioning template to configure the second application server.

18. The non-transitory computer readable medium of claim 17, wherein the second application server transmitted the request for the subset of provisioning features.

19. The non-transitory computer readable medium of claim 15, wherein identifying the provisioning features and associated files used by the first application server at runtime includes:
identifying service configuration options available during runtime of the first application server; and
determining one or more files that support each of the service configuration options.

20. The non-transitory computer readable medium of claim 19, further comprising instructions that are executable by the processing device for causing the processing device to:
build a data structure including the identified provisioning features and their associated files; and
store the data structure for use in building future provisioning templates.

* * * * *